*U. H. Duparck,*
*Cage Trap.*
Nº 44,168. Patented Sep. 13, 1864.
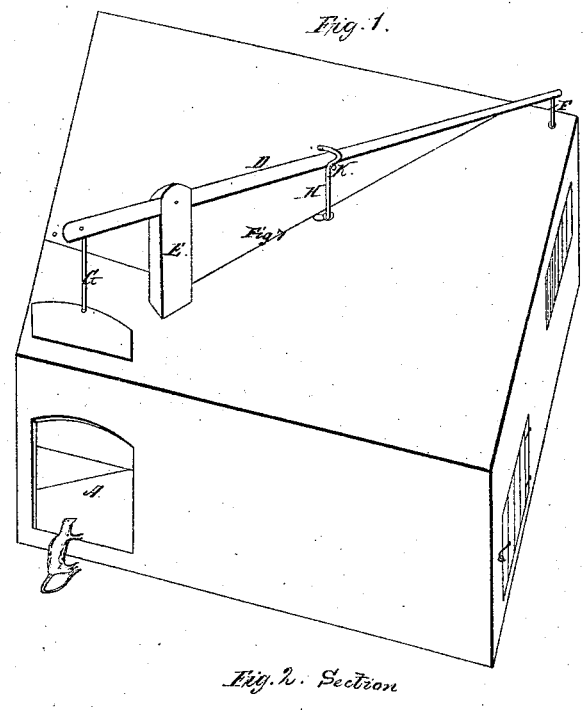
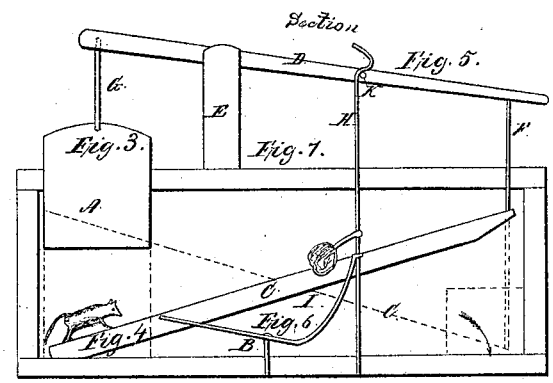
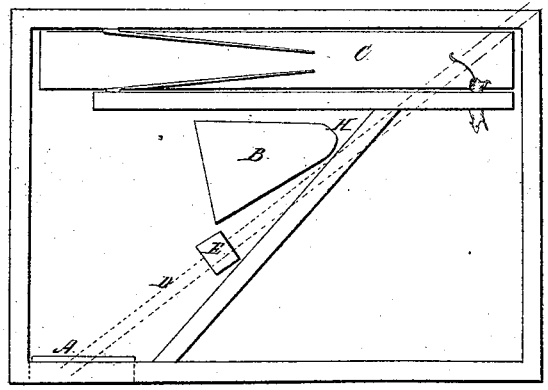
Witnesses:
M. O. Robertson
W. T. Loomis
Inventor:
U. H. Duparck

UNITED STATES PATENT OFFICE.

U. H. DUPARCK, OF ALBION, MICHIGAN.

IMPROVEMENT IN ANIMAL-TRAPS.

Specification forming part of Letters Patent No. 44,168, dated September 13, 1864.

*To all whom it may concern:*

Be it known that I, U. HARMON DUPARCK, of the town of Albion, county of Calhoun, and State of Michigan, have invented a new and useful machine for trapping game, called a "Game-Trap;" and I do hereby declare that the following is a full, clear, and exact description of the construction and operation of the same, reference being had to the annexed drawings, making a part of this specification, in which—

Figure 1 is a perspective view; Fig. 2, the bottom board, showing the drop-door A, the treadle B as attached to the spring trigger H, and the tipping board C. Fig. 3 is the drop-door, with chain G attached to hook onto lever D. Fig. 4 is the tipping board C, hung on balance-pin I, the longest end resting on the bottom of the trap, except when the game passes the balance-pin I, and the staple at the short end of the tipping board, to which is to be hooked the chain F. Fig. 5 is lever D, showing post E and chains F and G and pin K on lever D. Fig. 6 is the treadle B as attached to spring-trigger H. Fig. 7 is the top board of trap, showing the lever D and post E and spring-trigger H.

The game-trap is constructed as follows: As shown in Fig. 1, it is an oblong box, inclosed on all sides, with an opening at the end of one side, in which slides up and down the drop-door A. It is divided by two partitions into three compartments. The game enters the first compartment by the opening aforesaid, the drop-door being up when the trap is set. In the first compartment is the treadle B, to which the bait is fastened. The treadle B is attached to a spring-trigger, H, which, when the trap is set, hooks onto a pin, K, on lever D. When the animal steps on the treadle B, it unhooks the spring-trigger H from the pin K on lever D, and the drop-door A at the end of the lever D falls. The second compartment is a passage-way from the first into the third, in which is a tipping board, C, with its long end resting on the bottom of the trap at the entrance from the first compartment, and its short end reaching nearly the top of the trap over the entrance to the third compartment. The tipping board hangs near its center on a balance-pin, and when the animal leaves the first compartment and passes the balance-pin the tipping board tips down and opens the entrance to the third compartment. The short end of the tipping board is attached to the lever D, at the end opposite the drop-door aforesaid, by a chain, F, and when the animal reaches the short end of the tipping board, about to enter the third compartment, his weight brings down that end of the lever D and raises the drop door attached to the opposite end of the lever D, and at the same time the pin K on lever D, near the end opposite the drop-door, passes under the hook on the spring-trigger attached to the treadle B, and thus sets the trap as the animal enters the third compartment. When the animal steps off the tipping board, on entering the third compartment, the tipping board falls back to its first position, closing the entrance to the third compartment and securing the animal, while the trap is at the same time set for catching another.

What I claim is—

The attachment of the tipping board C to the lever D, by which the weight of the animal on the tipping board C, as he passes into the third compartment, raises the drop-door A and hooks the pin K on lever D over the spring-trigger H, attached to treadle B, and thus sets the trap.

U. H. DUPARCK.

In presence of—
WM. L. CASE,
F. A. WHEELOCK.